United States Patent [19]

Udell

[11] Patent Number: 5,145,215
[45] Date of Patent: Sep. 8, 1992

[54] FLEXIBLE COUPLER APPARATUS

[75] Inventor: Randal R. Udell, Lemont, Ill.

[73] Assignee: Senior Engineering Investments, B.V., Amsterdam, Netherlands

[21] Appl. No.: 692,120

[22] Filed: Apr. 26, 1991

[51] Int. Cl.$^5$ .................... F16L 21/00; F16L 27/12
[52] U.S. Cl. ..................... 285/49; 285/226; 285/300
[58] Field of Search ................. 285/49, 226, 299, 301

[56] References Cited

U.S. PATENT DOCUMENTS

| | | | |
|---|---|---|---|
| 1,505,121 | 8/1924 | Allport | 285/300 |
| 2,451,252 | 10/1948 | Stoeckly | 285/90 |
| 2,484,087 | 10/1949 | Hauf | 285/196 |
| 2,616,728 | 11/1952 | Pitt | 285/11 |
| 2,712,456 | 7/1955 | McCreery | 285/90 |
| 3,023,496 | 3/1962 | Millar | 285/286 X |
| 3,029,094 | 4/1962 | Parlasca et al. | 285/114 |
| 3,420,553 | 1/1969 | Poxon et al. | 285/49 |
| 3,627,354 | 12/1971 | Toepper | 285/55 |
| 3,770,303 | 11/1973 | Hallett | 285/45 |
| 3,820,829 | 6/1974 | Hasselbacher et al. | 285/226 |
| 3,869,151 | 3/1975 | Fletcher et al. | 285/114 |
| 3,915,482 | 10/1975 | Fletcher et al. | 285/226 |
| 4,162,801 | 7/1979 | Kresky et al. | 285/226 X |
| 4,251,094 | 2/1981 | Pinto | 285/382.5 |
| 4,283,078 | 8/1981 | Ross et al. | 285/45 |
| 4,350,372 | 9/1982 | Logsdan | 285/301 X |
| 4,408,785 | 10/1982 | Legros et al. | 285/49 |
| 4,445,332 | 5/1984 | Thies et al. | 60/455 |
| 4,526,409 | 7/1985 | Schaefer | 285/114 |
| 4,553,775 | 11/1985 | Halling | 285/55 |
| 4,659,117 | 4/1987 | Holzhausen et al. | 285/49 |
| 4,747,624 | 5/1988 | Faber et al. | 285/917 X |
| 4,792,161 | 12/1988 | Usui | 285/45 |

FOREIGN PATENT DOCUMENTS

| | | |
|---|---|---|
| 1244446 | 9/1960 | France . |
| 2324866 | 5/1977 | France ................. 285/226 |
| 6502305 | 8/1965 | Netherlands . |

OTHER PUBLICATIONS

Flexonics Inc. Technical Drawing No. 311-300-9001, Released for Production Feb. 4, 1980.

Primary Examiner—Michael F. Trettel
Attorney, Agent, or Firm—Dick and Harris

[57] ABSTRACT

A flexible coupler apparatus for joining successive lengths of pipe in an exhaust system for a vehicle. An inner sleeve member is concentrically received by an outer sleeve member. A substantially porous, non-sealing, vibration absorbing spacer member is arranged between the sleeve members where they overlap, to preclude direct contact between the sleeve members. The spacer member is non-sealing to preclude deterioration while minimizing interference with the reciprocation and articulation of the sleeve members. A flexible, extensible member mechanically connects the sleeve members at their distant non-overlapped ends. A closure member may be employed to protect the extensible member from damage from external elements and forces.

8 Claims, 2 Drawing Sheets

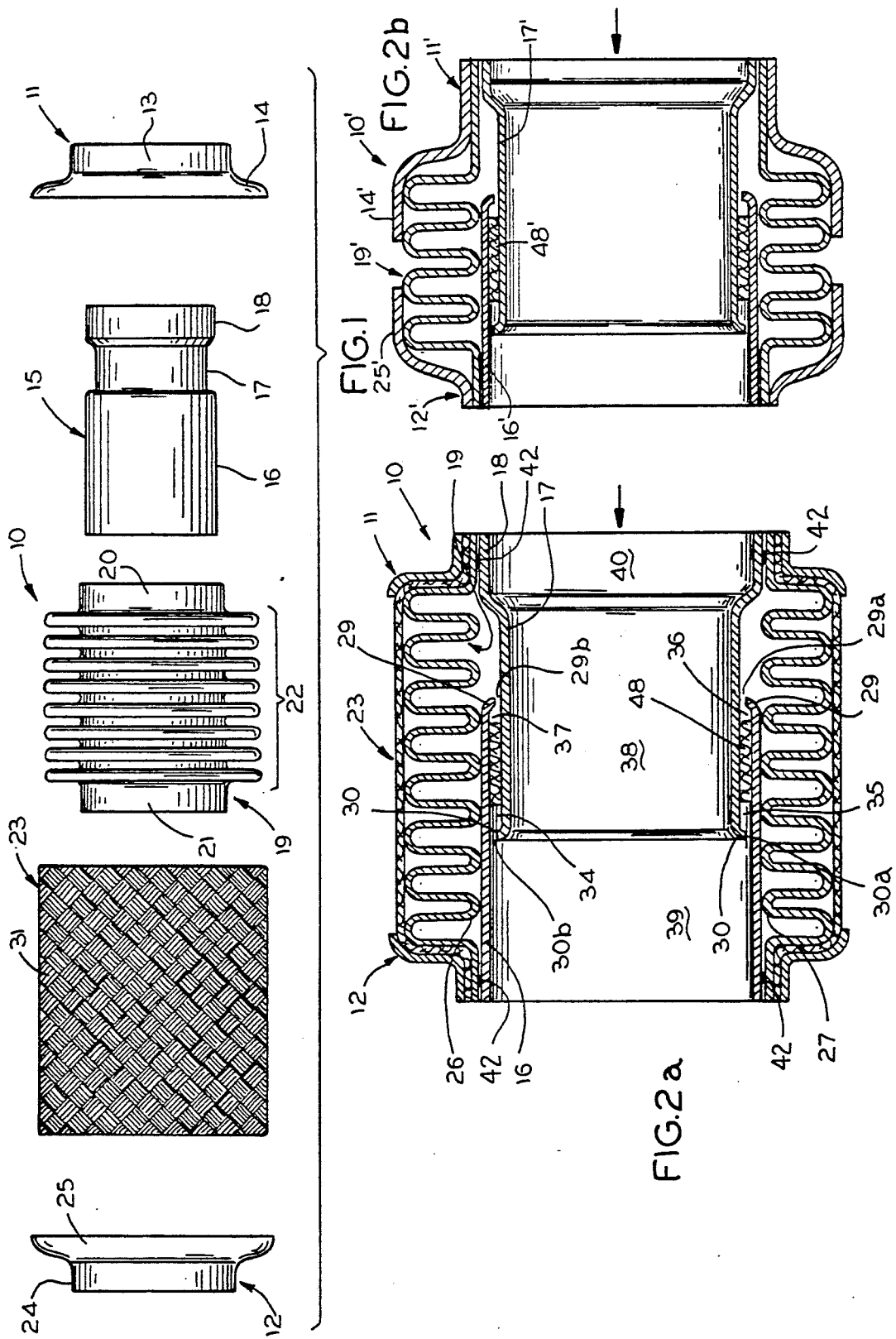

FLEXIBLE COUPLER APPARATUS

BACKGROUND OF THE INVENTION

The present invention relates to couplers for joining the ends of successive lengths of pipe or conduit, and in particular to couplers for joining the ends of successive pipes in an exhaust system for vehicles.

It is well known that, in vehicle exhaust systems, particularly those for heavy duty vehicles, such as large trucks, the motors produce a significant amount of vibration in the exhaust pipes. Operation of the motors at continuous speeds for prolonged periods of time can, especially, produce what are known as harmonic vibrations which can cause significant deflections in extended lengths of exhaust pipe. Repeated deflections of the exhaust pipe will, in turn, cause the pipe to weaken with time and ultimately fail. Further, such harmonic vibrations will also be transmitted through the exhaust pipes to the mountings of the pipes, promoting the loosening of the mountings, which can result in the sudden displacement of one or more components of the exhaust system, with the potential for both personal injury and equipment damage.

In addition to the vibrations created by the motor of the vehicle, an exhaust system is also subjected to various tension, compression and bending forces which arise during the operation of the vehicle. While individual components might be made stronger and more massive to resist failure by fatigue, such construction would be undesirable due to weight considerations. Further, by making individual elements stiffer, the vibrations are merely transmitted to the exhaust system mountings or other components, not reduced or eliminated. Accordingly, it is desirable to isolate the exhaust system, or at least components of the system from such vibrations and forces.

It is known that if the pipes of an exhaust system are divided and separated by non-rigid connections, rather than as continuous extended lengths, the development of harmonic vibrations from the motor is precluded or reduced. Such non-rigid connections can be advantageously employed to absorb other tension, compression and bending forces, in addition to motor vibrations.

It is therefore desirable to provide a coupler for joining successive lengths of exhaust pipe, which coupler joins the pipes in a non-rigid fashion and is capable of absorbing tension, compression and bending forces, without transmitting them from one pipe to the next.

An example of a prior art coupler is U.S. Pat. No. 4,792,161 to Usui. In Usui, a pair of concentrically arranged spring coils are utilized to provide a mechanical connection between the pipes to be joined. One drawback of the coupler in Usui is that when the coils are in a stretched or bent position, gaps may form between individual bights of the coil, into which dirt, debris and moisture may invade, which may interfere with the operation of the coils, and lead to ultimate degradation of the coils through abrasion, rusting, and so forth. In addition, the coils (which ar arranged one threaded within the other) are unprotected and exposed to the elements at all times, and are thus susceptible to damage from abrasion and other harmful physical contact. A further drawback of the coupler in Usui is that a sealing ring, positioned between overlapping pipe ends, is relied upon to provide sealing means to prevent escape of the exhaust gases. The sealing ring is subjected to cyclical flexure, tension and compression forces which will ultimately compromise the seal and require replacement of the coupler.

It is therefore an object of this invention to provide a flexible coupler for placement between successive lengths of exhaust pipe for damping and blocking the transmission of vibration and other forces from one length of pipe to the next which is durable and not subject to attack by dirt, debris and the elements.

Yet another object of the invention is to provide a flexible coupler which does not utilize a sealing means positioned between moving exhaust system components which may cause the seal to prematurely yield requiring replacement of the coupler.

It is further an object of this invention to provide a flexible coupler for exhaust pipes which provides means for mechanically connecting the ends of the pipes to be joined, which means are themselves protected from interference and/or degradation by external forces and elements.

Still yet another object of the invention is to provide a flexible coupler apparatus for exhaust pipe systems which provides improved audio isolation to reduce or preclude migration of motor noise into the passenger compartment of the vehicle.

These and other objects of the invention will become apparent in light of the present specification, claims and drawings.

SUMMARY OF THE INVENTION

A flexible coupler apparatus is provided for non-rigidly connecting the ends of successive lengths of pipe, typically in the environment of an exhaust system of a vehicle. The flexible coupler apparatus provides mechanical connection of the successive lengths of pipe, while damping and/or precluding transmission of vibration from one pipe to the next.

The flexible coupler apparatus includes an inner sleeve member, and an outer sleeve member. The outer sleeve member slidingly receives a free end of the inner sleeve member, placing the sleeve members in concentrically overlapping relation to each other over at least a portion of their respective lengths. The sleeve members are further configured to be axially and angularly movable relative to each other.

A porous spacer member is positioned between the sleeve members in the region in which the sleeve members overlap, to maintain the sleeve members in spaced relation to each other. The spacer precludes direct contact between the sleeve members and is resistively resilient to dampen vibrations received from one pipe to preclude transmission of same to the other pipe. In a preferred embodiment of the invention, the porous spacer member is a flexible annular member which is positioned around the inner sleeve member, between the inner and outer sleeve members. In particular, metal wire mesh may be used to form the porous spacer member.

A resilient sealing member is affixed to the remote, non-overlapping ends of the sleeve members, to maintain the sleeve members in mechanical connection with each other. The resilient sealing member is configured to permit limited axial and bending movement of the sleeve members relative to each other, while damping vibrations received from the pipes. A flexible tubular member, having a plurality of circumferential undulations formed along its length, preferably forms the resilient sealing member.

Means are provided for limiting the axial movement of the inner sleeve member relative to the outer sleeve member. In a preferred embodiment of the invention, rims are formed on the adjacent ends of the inner and outer sleeve members, outward curving on the inner sleeve member, and inward curving on the outer sleeve member, with the porous spacer member positioned between the respective rims.

In another preferred embodiment of the invention, a flexible closure member may be provided which encloses and protects the resilient sealing member, and the overlapping portions of the sleeve members.

The flexible closure member comprises, a braided metal wire tube, with the ends of the tube affixed to the remote ends of the inner and outer sleeve members. The braided metal wire tube is capable of flexing to accommodate stretching, compressing and bending forces.

BRIEF DESCRIPTION OF THE DRAWINGS

FIG. 1 is an exploded side elevation of the flexible coupler apparatus according to a preferred embodiment of the invention;

FIG. 2a is a side elevation, in section, of the assembled flexible coupler apparatus according to FIG. 1;

FIG. 2b is a side elevation of an alternative preferred embodiment of the invention;

DETAILED DESCRIPTION OF THE DRAWINGS

Figure 3:
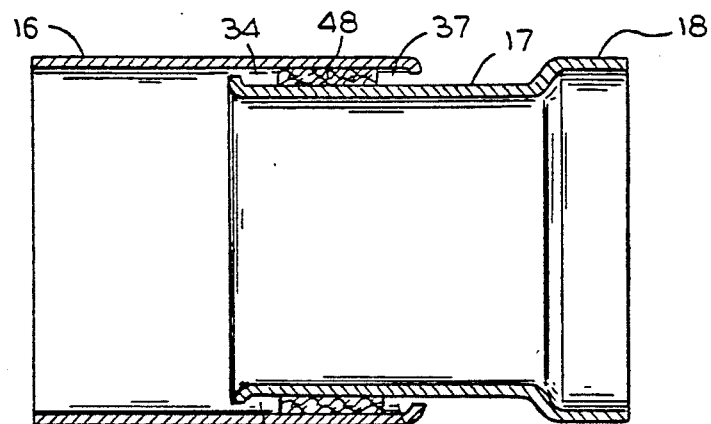
FIG. 3 is a side elevation, in section, showing the flexible coupler apparatus of FIG. 1, in its initial position.

While this invention is susceptible of embodiment in many different forms, there is shown in the drawings and will herein be described in detail, several embodiments, with the understanding that the present disclosure is to be considered as an exemplification of the principles of the invention and is not intended to limit the invention to the embodiments illustrated.

The components of the flexible coupler apparatus according to a preferred embodiment, are shown in exploded view in FIG. 1. Flexible coupler apparatus 10 includes end cap 11 having collar 13 and flange 14, at one end, with end cap 12, having collar 24 and flange 25, at the other end. Inner sleeve member 17 is a substantially cylindrical hollow tube, which includes radially enlarged inlet portion 18. Inner sleeve member 17 is insertably receivable within outer sleeve member 16, which is also a substantially cylindrical hollow member. Together, inner sleeve member 17 and outer sleeve member 16 form joint assembly 15.

When flexible coupler apparatus 10 is positioned between the free ends of successive sections of exhaust pipe to be connected, coupler apparatus 10 must be positioned so that inlet portion 18 is affixed to that section of pipe "coming from" the motor. In FIGS. 2a and 2b, the direction of fluid flow is indicated by the horizontal arrows. In that way, the exhaust gases proceed through the narrower of the two concentrically arranged sleeve members first, and the gases are thus less likely to be driven by the exhaust pressure into the gap between the sleeve members where they overlap.

As described hereinafter, joint assembly 15 is substantially coaxially received within bellows 19. Bellows 19 is a resilient flexible member, which includes inlet collar 20 and outlet collar 21, between which a plurality of circumferential undulations are arranged along the length of bellows 19. In a preferred embodiment of the invention, bellows 19 is fabricated from metal and is impervious to the passage of fluid. Upon assembly of flexible coupler apparatus 10, inlet collar 20 will be affixed to inlet portion 18, and outlet collar 21 will be affixed to a portion of outer sleeve member 16. Circumferential undulations 22 enable bellows 19 to be extended or compressed or bent, while maintaining a mechanical sealing connection between outer sleeve member 16 and inner sleeve member 17, so as to preclude the escape of exhaust gases. Closure member 23, which is fabricated preferably of a metal wire braid 31, is wrapped around bellows 19 in order to protect undulations 22 from damaging external contacts.

The assembly of flexible coupler apparatus 10 is shown in FIG. 2a. Inner sleeve member 17 is insertingly received within an end portion of outer sleeve member 16. Porous spacer member 48 is arranged between the outer surface of inner sleeve member 17 and the inner surface of outer sleeve member 16, in order to prevent direct contact between inner sleeve member 17 and outer sleeve member 16. In order to maintain porous spacer member 48 between outer sleeve member 16 and inner sleeve member 17, the rim 29 of outer sleeve member 16 is turned inward, while the end rim of inner sleeve member 17 is turned outward. The air gap between in rim 29 and inner sleeve member 17 is shown, in section in FIG. 2a as spaces 29a and 29b. Similarly, the air gap between inner and outer sleeve members 17 and 16 is shown, in sectional view in FIG. 2a as gaps 30a and 30b. It is understood that in actuality, the air gaps represented by spaces 29a, 29b, 30a and 30b, are cylindrical in nature and of substantially uniform thickness when flexible coupler apparatus 10 is at rest.

Bellows 19 is sufficiently large in diameter to receive assembled inner sleeve member 17 and outer sleeve member 16. Bellows 19 is affixed to inner and outer sleeve members 17 and 16 by welds 42, creating a mechanical connection between sleeve members 17 and 16 through bellows 19. Closure member 23 is positioned around bellows 19, with the length of closure member 23 being sufficient to extend at least the full length of bellows 19, including to the edges of inlet collar 20 and outlet collar 21, respectively. End caps 11 and 12 snugly fit over closure member 23, bellows 19 and the end portions of sleeve members 16 and 17, and may be affixed by any suitable method, such as welding or brazing. The ends of sleeve members 16 and 17 should project slightly outward from inlet and outlet collars 20 and 21, respectively, in order to facilitate attachment of sleeve members 16 and 17 to the free ends of the pipes to be connected. The non-porous construction of bellows 19, together with welds 42, assure that escape of exhaust gases is prevented.

A further preferred embodiment of the invention is shown in FIG. 2b, which does away with closure member 23 of the previous embodiment. In this embodiment, flexible coupler apparatus 10, includes inner sleeve member 17', which is insertingly received by outer sleeve member 16'. Porous spacer 48', as in the other embodiment, is disposed between inner sleeve member 17' and outer sleeve member 16' and functions in the same manner as in the FIG. 2a embodiment. Bellows 10' is shortened, and flange 14 of end cap 11 and flange 25 of end cap 12 are enlarged. Accordingly, under most operating conditions, most of bellows 19' is surrounded by one or the other of end caps 11 and 12. This configuration, which is suitable for applications where space is particularly limited, or where the magnitude of the vibrations encountered is small, will serve to adequately protect bellows 19' from impinging debris and contacts. The general operation of flexible coupler apparatus 10 is substantially identical to that described herein with respect to the FIG. 2a embodiment.

Figure 4:
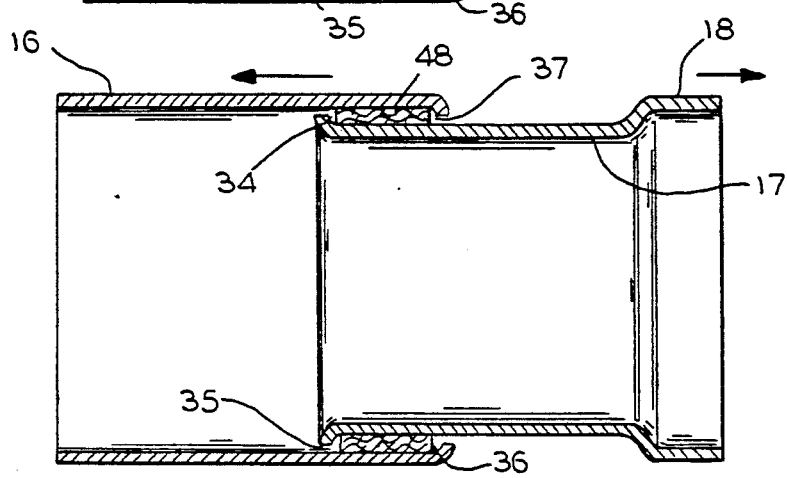
FIG. 4 is a side elevation, in section, of the flexible coupler apparatus of FIG. 1, when subjected to tension forces.
Figure 5:
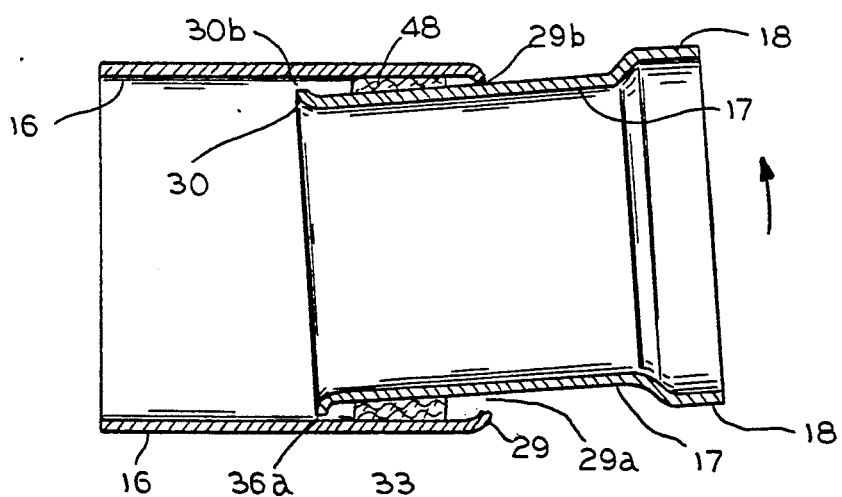
FIG. 5 is a side elevation, in section, showing the flexible coupler apparatus of FIG. 1, when subjected to bending forces.
Figure 6:
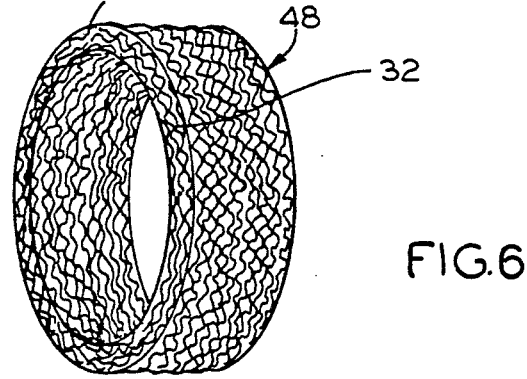
FIG. 6 is a perspective view of the porous spacer member.

Returning to the embodiment of FIG. 2a, the operation of flexible coupler apparatus 10 is shown in FIGS. 3-5. Bellows 19, closure member 23, and end caps 11 and 12 have been deleted, for clarity of representation. Flexible coupler apparatus 10, at rest, occupies a position as shown in FIG. 3. Outlet side clearances 34 and 35 (which represent in actuality, an annular space) are uniform and of substantially equal width to inlet side clearances 36 and 37 (also representing an annular space).

If the exhaust pipe system, into which flexible coupler apparatus 10 has been mounted, is subjected to a tension force, for example, as indicated in FIG. 4, bellows 19 (not shown) elongates, in a known manner, permitting inner sleeve member 17 and outer sleeve member 16 to slide relatively away from each other. Porous spacer member 48, not being affixed to either the exterior of inner sleeve member 17, or the interior of outer sleeve member 16, may slide along either, maintaining air gaps 29a and 29b, and 30a and 30b more or less constant, in the absence of any lateral forces. Outlet clearances 34 and 35, and inlet clearances 36 and 37, gradually shrink in width until a maximum position of relative movement of inner sleeve member 17 relative to outer sleeve member 16 is reached, with both rims 29 and 30 abutting opposite ends of porous spacer member 48.

Once this position has been reached, normal tension forces will not be able to significantly longitudinally compress porous spacer member 48, and further relative movement of the sleeve members will be precluded.

Under compressive forces, the movement of sleeve members 16 and 17 (not shown) will be the reverse to that described, with the maximum relative movement being defined by the amount of available overlap of the sleeve members and the maximum possible compression of bellows 19. In a preferred embodiment of the invention, the aforementioned parameters are configured so that under normal operating conditions, the extreme limits of movement are not reached.

In addition to longitudinal forces, an exhaust pipe system is exposed to bending forces normal to the longitudinal direction of the pipes. Flexible coupler apparatus 10 is configured to absorb such bending forces, without transmitting them to the pipes, thus relieving the pipes from further fatigue wear and lengthening the useful lifespan of the pipes. As shown in FIG. 5, when flexible coupler apparatus 10 is subjected to a bending force, inner sleeve member 17 moves angularly relative to outer sleeve member 16. In a preferred embodiment of the invention, air gaps 29a, 29b, 30a and 30b are configured to be sufficiently large enough to permit angular movement to absorb bending forces encountered in normal use.

Porous spacer member 48 in a preferred embodiment of the invention is fabricated of metal wire mesh preferably steel mesh, and is tough and resistively compressible, to gradually absorb the bending force and either prevent direct contact between the sleeve members or reduce the force of such contact to prevent damage. Appropriate sizing of the thickness of porous spacer member 48, relative to the diameters of the sleeve members, can further reduce the likelihood or frequency of contact between the sleeve members through relative angular movement. The use of metal wire mesh is superior to elastomeric materials, such as rubber, which have been found to be unacceptably susceptible to fatigue failure and loss of resiliency and compression resistance. In addition, the use of sealing materials such as rubber is not necessary, since porous spacer member 48 is not required to act as a fluid impervious sealing member.

The foregoing embodiments of the flexible coupler apparatus have the advantageous feature of providing enhanced audio isolation, in reducing or precluding transmission of motor noise from the exhaust pipe system into the passenger compartment of the vehicle.

A further benefit derived from the foregoing embodiments is that while the configurations accommodate axial and lateral vibrations to preclude transmission of same along the exhaust pipe system, the flexible coupler apparatus provides a supporting connection between the two pipes that are being connected such that the need of an external support, such as a bracket or stringer suspended from the body or chassis of the vehicle is substantially eliminated.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A flexible coupler apparatus for connecting adjacent ends of successive pipes to direct fluid flow from one of said two pipes to the other of said two pipes, while precluding transmission of vibration between said two pipes, said flexible coupler apparatus comprising:
   an inner sleeve member having an end operably affixable to one of said two pipes, and a free end;
   an outer sleeve member having an end operably affixable to the other of said two pipes, and a free end;
   said inner and outer sleeve members separated by an annular space to permit angular displacement therebetween,
   said free end of said outer sleeve member operably arranged to slidingly receive said free end of said inner sleeve member, a portion of said outer sleeve member thereby concentrically overlapping a portion of said inner sleeve member, said outer and inner sleeve members further operably arranged for axial and angular movement relative to each other to, in turn, accommodate axial and angular movement of said two pipes relative to each other;
   a substantially porous, vibration absorbing spacer member positioned between said inner and outer sleeve members, within said annular space, for maintaining said inner sleeve member and said outer sleeve member in spaced relation to each other along said overlapping portions of said outer and inner sleeve members, and for precluding transmission of vibrations from said inner and outer sleeve members to each other; and a resilient sealing member affixed to said outer sleeve member and said inner sleeve member for maintaining said two pipes in flexibly joined relation to each other to accommodate and enable substantial compressive and extensive axial movement as well as angular movement of the outer and inner sleeve members relative to each other, preclude transmission of vibrations of said outer and inner sleeve members to each other and preclude escape of fluid from said flexible coupler apparatus.

2. The flexible coupler apparatus according to claim 1, further comprising:

means for limiting axial movement of said inner sleeve member relative to said outer sleeve member.

3. The flexible coupler apparatus according to claim 1, wherein said resilient sealing member further comprises a flexible tubular bellows member having formed therein a plurality of circumferential undulations along its length.

4. The flexible coupler apparatus according to claim 1, further comprising:

a flexible closure member for enclosing and protecting said resilient member and said free overlapping ends of said outer and inner sleeve members.

5. The flexible coupler apparatus according to claim 4 wherein said flexible closure member comprises:

a braided metal wire tube, having two ends, one of said ends operably affixed to said outer sleeve member, another of said ends operably affixed to said inner sleeve member, said braided metal wire tube being configured to accommodate axial compression and extension, as well as twisting and bending movements, of said outer and inner sleeve members relative to each other.

6. The flexible coupler apparatus according to claim 1, wherein said substantially porous, vibration absorbing spacer member comprises:

a flexible annular member positioned around said inner sleeve member, between said inner sleeve member and said outer sleeve member.

7. The flexible coupler apparatus according to claim 6, wherein said flexible annular member further comprises a band fabricated of metal wire mesh.

8. The flexible coupler apparatus according to claim 6 wherein said porous spacer member comprises:

an annular member formed from metal wire mesh.

* * * * *

UNITED STATES PATENT AND TRADEMARK OFFICE
CERTIFICATE OF CORRECTION

PATENT NO. : 5,145,215

DATED : September 8, 1992

INVENTOR(S) : Udell, Randal R.

It is certified that error appears in the above-identified patent and that said Letters Patent is hereby corrected as shown below:

| | |
|---|---|
| Col. 1, line 60 | "ar" should be instead -- are -- |
| Col. 4, line 65 | "10," should be instead -- 10' -- |
| Col. 5, line 11 | "10" should be instead -- 10' -- |

Signed and Sealed this

Nineteenth Day of October, 1993

Attest:

BRUCE LEHMAN

Attesting Officer     Commissioner of Patents and Trademarks